(12) United States Patent
Wang et al.

(10) Patent No.: US 7,337,747 B2
(45) Date of Patent: Mar. 4, 2008

(54) MAGNETICALLY-ATTRACTABLE NON-CLUMPING ANIMAL LITTER

(75) Inventors: Zhen Wang, Hoffman Estates, IL (US); Vincent J. Losacco, Geneva, IL (US); Michael Ray Velder, Belle Fourche, SD (US); Bala Nathan, Wheaton, IL (US); Bart Becherer, Arlington Heights, IL (US); Jerald W. Darlington, Jr., Marengo, IL (US)

(73) Assignee: AMCOL International Corporation, Arlington Heights, IL (US)

( * ) Notice: Subject to any disclaimer, the term of this patent is extended or adjusted under 35 U.S.C. 154(b) by 0 days.

(21) Appl. No.: 11/521,808

(22) Filed: Sep. 15, 2006

(65) Prior Publication Data
US 2007/0175403 A1    Aug. 2, 2007

Related U.S. Application Data

(62) Division of application No. 11/346,136, filed on Feb. 2, 2006, now Pat. No. 7,228,819.

(51) Int. Cl.
*A01K 29/00* (2006.01)
(52) U.S. Cl. .................................................... 119/171
(58) Field of Classification Search .................. None
See application file for complete search history.

(56) References Cited

U.S. PATENT DOCUMENTS

| 5,352,780 | A  | * | 10/1994 | Webb et al. ............... 536/56 |
| 5,503,111 | A  | * | 4/1996  | Hughes ...................... 119/173 |
| 6,302,060 | B1 | * | 10/2001 | Schumaier ................. 119/165 |
| 7,228,819 | B1 | * | 6/2004  | Wang et al. ............... 119/171 |
| 6,860,233 | B2 | * | 3/2005  | Buttersack et al. ........ 119/171 |
| 6,962,129 | B1 | * | 11/2005 | Lawson ...................... 119/173 |

* cited by examiner

*Primary Examiner*—Thomas Price
(74) *Attorney, Agent, or Firm*—Marshall, Gerstein & Borun LLP

(57) ABSTRACT

A particulate non-clumping animal litter composition is disclosed. The composition comprises non-clumping absorbent particles bound to magnetically-attractable metal particles such that substantially all particles of the animal litter composition are attracted to a magnetic surface. The animal litter composition exhibits favorable properties such as absorbency, resiliency, homogeneity, and particle size. Methods of production for non-clumping animal litter compositions are also disclosed that employ sufficient shear to bind the non-clumping absorbent particulate material to the magnetically-attractable metal particles such that the animal litter compositions exhibit favorable properties. A method and apparatus for the collection of magnetically-attractable animal litter particles are also disclosed.

39 Claims, 1 Drawing Sheet

MAGNETICALLY-ATTRACTABLE NON-CLUMPING ANIMAL LITTER

CROSS-REFERENCE TO RELATED APPLICATION

This application is a divisional of application Ser. No. 11/346,136 filed Feb. 2, 2006, the entire application of which is hereby incorporated herein by reference.

FIELD OF THE INVENTION

The present invention relates to a magnetically-attractable non-clumping absorbent animal dross composition and its method of manufacture and use. More particularly, the present invention is directed to an absorbent composition that is a combination of a non-clumping absorbent particulate material and magnetically-attractable metal-containing particles adhered together by high-shear mixing or extrusion to provide particles having a favorable size distribution, while maintaining magnetism in essentially every particle.

BACKGROUND AND PRIOR ART

U.S. Pat. No. 6,302,060 B1 ('060) describes a magnetic pet litter apparatus that includes a magnetically-attractable pet litter contained within a pet litter box, or other litter containment structure, and includes one or more permanent magnets positioned externally to the litter box to magnetically attract and collect particles of the litter brought outside the litter box by a pet, such as a cat. As described in the '060 patent, the pet litter is a mixture of a bentonite clay containing sodium and 5% or more by weight of iron or a ferrous alloy. As described in the '060 patent, a preferred method of forming the litter particles is to blend iron or iron oxide in slurry form with the bentonite clay, such as the bentonite clay described in this assignee's U.S. Pat. No. 5,503,111.

As described in the '060 patent, pets such as cats that use litter boxes tend to scatter particles of litter outside of the litter box leaving an unsanitary mess for the pet owner to clean. This typically happens when, upon exiting the litter box, the pet scatters litter with its feet. The magnetically-attractable litter particles described herein are non-clumping and are combined with a magnetically-attractable metal so that the litter particles also are capable of being magnetically removed from a pet's feet upon exiting the litter box. The magnetically-attractable non-clumping animal litter particles described herein are particularly suitable for use in the magnetic apparatus described in U.S. Pat. No. 6,302,060 B1, or any other magnetic litter apparatus capable of attracting magnetically-attractable metal-containing litter particles.

SUMMARY

Figure 1:
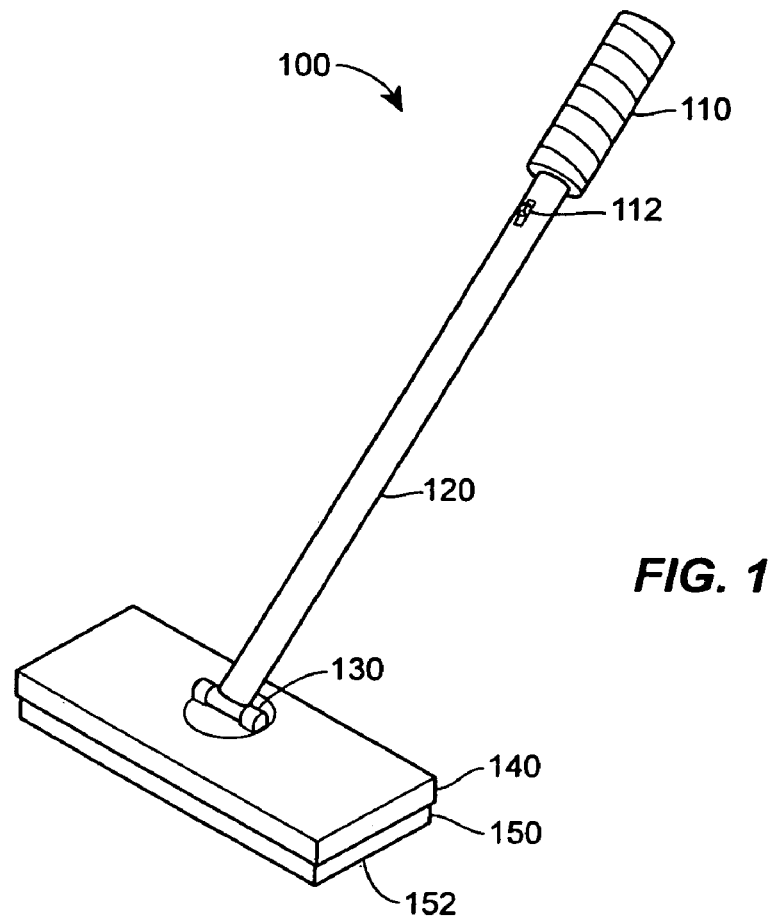
FIG. 1 illustrates a perspective view of a magnetic sweeper in accordance with the present disclosure.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

In brief, the compositions described herein absorb animal dross when wetted and are magnetically attracted to a confined magnetic area when scattered from their intended location by a pet. Substantially all of the particles in the present composition are attracted to a static, horizontal magnetic surface. The composition comprises discrete particles of a combined/adhered combination of a magnetically-attractable metal and non-clumping absorbent particulate material that effectively absorbs animal dross. The non-clumping absorbent particulate material is combined with magnetically-attractable metal particles, preferably iron-containing particles, using a high-shear mixer, such as a pin mixer or extruder, to form magnetically-attractable particles which maintain their absorbency, resiliency, homogeneity, and particle size. If extrusion is used, pellets are formed, and the pellets are divided into discrete, magnetically-attractable particles, e.g., in a suitable grinder or mill.

The process of manufacturing a non-clumping animal litter that is magnetically-attractable is not a matter of simply combining an absorbent material with iron or an iron alloy, as outlined in the '060 patent, particularly from the standpoint of obtaining sufficient magnetic attraction of essentially all of the particles and maintaining the integrity of the litter particles. A non-clumping absorbent particulate material and magnetically-attractable metal particles cannot simply be slurried together to obtain a magnetically-attractable litter composition, as described in the '060 patent.

In accordance with the method described herein, in order to provide magnetically-attractable non-clumping pet litter particles, it has been found that it is necessary to combine particles containing a metal that is attracted to a magnet, such as iron, nickel or cobalt, of a particular size distribution, together with a non-clumping absorbent particulate material of a particular size distribution; provide each in a particular percentage by weight; mix the absorbent material and metal-containing particles in a high-shear mixer; dry the particles to less than 15 weight % water (relative to the total weight of absorbent material and water); and size the dried particles or pellets to a particular size distribution. In one embodiment, a suitable binder is combined with the absorbent material and metal-containing particles.

Therefore, one aspect of the compositions and methods described herein is to provide an improved absorbent, magnetically-attractable litter composition for animal waste products and related waste products.

Another aspect of the compositions and methods described herein is to provide a magnetically-attractable litter composition that economically eliminates or reduces odors associated with animal dross deposited in a litter box.

Another aspect of the compositions and methods described herein is to provide a magnetically-attractable litter composition that facilitates and reduces cleaning and maintenance of animal litter boxes and animal cages, particularly in areas surrounding the litter boxes and cages.

Still another aspect of the compositions and methods described herein is to provide a magnetically-attractable litter composition that overcomes the cleaning disadvantages of prior art animal litter box absorbent compositions, when the litter is scattered by the pet outside of the litter box.

Another aspect of the compositions and methods described herein is to provide a magnetically-attractable litter composition that, when scattered outside of a confined area, e.g., a litter box, is magnetically attracted to a defined magnetic collection area for easy disposal and/or reuse.

Still another aspect of the compositions and methods described herein is to provide a magnetic or electromagnetic clean-up method of removing the scattered magnetically-attractable litter particles from the magnetic collection area for re-use or discarding.

DETAILED DESCRIPTION

The litter box absorbent composition described herein comprises, in one embodiment, a non-clumping absorbent particulate material combined with magnetically-attractable metal-containing particles under pressure and/or high-shear, optionally with a suitable binder, preferably without a binder other than water. The absorbent composition contains preferably about 50 to 98 weight % (more preferably about 80 to 97 weight %) of a non-clumping absorbent particulate material and preferably about 2 to 50 weight % (more preferably about 3 to 20 weight %) of magnetically-attractable metal particles.

Non-Clumping Absorbent Particulate Material

The absorbent material suitable for the compositions herein is a fine particulate material that sufficiently hydrates in the presence of water but does not clump to form a large agglomerated mass of soiled litter. As used herein, the term "absorbent" refers to the processes of absorption and/or adsorption. To achieve the full advantage of the compositions and methods described herein, the absorbent material should have a particle size such as that at least 25%, preferably at least 50%, more preferably at least 65% of the particles, by weight, pass through a 50-mesh (U.S. Sieve Series) screen.

The non-clumping absorbent particulate materials useful in accordance with the compositions and methods described herein include: calcium bentonite, talc, pyrophyllite, vermicullite, illite, phlogopite, muscovite clay, kaolinite clay, attapulgite (palygorskite), sepiolite clay, alganite, diatomite, tobermorite, marl, calcined clay, zeolite, silica, silica gel, sand, fullers earth, diatomaceous earth, cellulosic material (wood including cedar, pine and etc, paper, cotton), corn cob, straw, rice husk, maize fiber alfalfa, wheat, peanut (and other nut) shells, grass, green tea leaves, absorbent polymers, calcium silicate, gypsum, synthetic gypsum, slate, pumice, building waste, or any mixture of the above. The preferred non-clumping absorbent particulate materials include non-swelling clays in general, and more preferably include non-swelling clays such as calcium bentonite, kaolinite, attapulgite (palygorskite), and sepiolite.

Optionally, other additives, in amounts of about 1% to about 49%, can be added to the non-clumping absorbent particulate material. Examples of optional additives include fragrances, color agents, anti-microbial agents, odor-control agents, odor-masking agents, bactericides, or combinations thereof. However, any optionally-added ingredient cannot be present in an amount that materially and adversely affects the ability of the litter particles to be attracted to a magnet and to absorb liquid dross products. Any optional ingredients may be blended into absorbent composition when mixed together using a high-shear mixer.

It should be noted that the animal dross absorbent compositions described herein can be used in litter boxes or in cages of animals including, among others, household pets such as cats, dogs, gerbils, guinea pigs, mice and hamsters; other pets such as rabbits, ferrets and skunks; or laboratory animals such as monkeys, mice, rats, goats, horses, cows and sheep. The animal litter absorbent compositions described herein are especially useful for smaller animals, such as cats. Furthermore, the high-shear mixed or extruded compositions described herein are suitable for other uses in addition to absorbing urine, such as absorbing vomit or adsorbing waste liquids in appropriate areas of slaughter houses and meat packing plants.

Magnetically-Attractable Metal Particles

Magnetically-attractable metal particles suitable for the compositions described herein preferably contain iron, cobalt, and/or iron. Examples of elements, alloys, compounds, and minerals that all fall within the definition of "metal" as used in this disclosure include: iron, nickel, cobalt, awaruite, wairauite, magnetite, taconite, maghemite, jacobsite, trevorite, magnesioferrite, pyrrhotite, greigite, and feroxyhyte. Preferably, the magnetically-attractable metal particles are iron-containing particles. Preferred iron-containing particles are taconite and/or magnetite. To achieve the full advantage of the compositions and methods described herein, the taconite particles should have an iron content of at least about 20 weight %, preferably at least about 40 weight %, and more preferably at least about 50 weight %. To achieve the full advantage of the compositions and methods described herein, the magnetically-attractable metal-containing particles should preferably have a particle size such that at least 25 weight % of the particles, more preferably 50 weight %, even more preferably 65 weight %, are of size to pass through a 50-mesh screen (U.S. Sieve Series). The concentration of the magnetically-attractable metal particles in the absorbent composition should be in the range of about 2% to about 50% by weight, preferably about 3% to about 20% by weight.

Binders (Optional)

The magnetically-attractable metal particles can be adhered to the non-clumping absorbent particulate material with or without a suitable binder. If a binder is used, the preferred binder is water, which surprisingly irreversibly adheres the metal-containing particles to the absorbent particles via high-shear mixing. When an additional binder is used, the preferred binders are water-soluble adhesives including, but not limited to, water-soluble polysaccharides, particularly a water-soluble cellulosic ether adhesive, such as carboxymethyl cellulose, methyl cellulose, hydroxypropyl cellulose, hydroxypropylmethyl cellulose, hydroxybutylmethyl cellulose, or mixtures thereof. A preferred amount of water-soluble polysaccharide (in particular carboxymethyl cellulose) is about 0.025 to less than about 0.1 weight %. Aqueous sodium silicate (available as product N® from PQ Corporation, Valley Forge, Pa.) is also a preferred binder at concentrations of up to about 5 weight %, more preferably from about 0.5 to 2 weight %, and most preferably at about 1 weight %. Other useful water-soluble adhesives include alignates and starches, such as wheat paste (a pregelatinized starch); gums, such as xanthan gum or guar gum; sodium or calcium lignosulfonate; glycerin; sucrose; lactose; dextrose; dextrin; water-soluble polymers, such as polyvinyl pyrrolidone, polyvinyl alcohol, or polyvinyl acetate, and those water-soluble polymers disclosed in this Assignee's U.S. Pat. No. 5,267,532, hereby incorporated by reference.

High-Shear Mixing

When mixed in a high-shear mixer, the magnetically-attractable metal/absorbent composition provides increased individual particle resiliency (preferably at least about 50%, more preferably at least about 75%, and most preferably about 75 to 98%), and decreased mixture inhomogeneity (preferably less than about 30%, more preferably less than about 20%, and most preferably less than about 10%) as compared to the same material without high-shear mixing. See the attrition test methods for resiliency and inhomogeneity, infra. High-shear mixers are characterized by local velocity gradients and mixing patterns that compress absorbent and metal fines together, thereby binding them in a stable, well-mixed aggregate of particles. It has been found that without these aspects of high-shear mixing, the absorbent/metal combination suffers from being dusty (because the fine absorbent particles are not sufficiently agglomerated) and from a tendency of the final absorbent/metal particles to break apart during handling and storage, thereby separating the absorbent from the magnetically-attractable metal. Examples of high-shear mixers appropriate for the present disclosure include pin mixers, pug mills, extruders, and counter-current mixers.

Generally, the water content of the absorbent/metal particle composition during mixing should be in the range of about 10-45 weight %, preferably about 15-40 weight %, and more preferably about 18-35 weight %, based on the dry weight of the absorbent material, when the absorbent/metal particle composition is mixed with a high-shear mixer. If the absorbent is too dry, it would be forced through, for example, the die openings of an extruder or the exit of the pin-mixer, in a powdery form without sufficient adherence to the metal particles, resulting in insufficient agglomeration of absorbent and metal particles. If too wet when mixed, the absorbent/metal particle composition becomes very sticky and may very well clog the high-shear mixer.

Pin-Mixer

A pin mixer is a high-shear mixing device that is also called a micro-pelletizing device and is the preferred high-shear apparatus for combining the absorbent and metal particles. It compresses the absorbent and metal particles together to form small particles that require no further grinding to provide a substantial percentage of permanently combined absorbent/metal particles that have the desired particle size. When removed from the pin-mixer, the particles are dried to less than about 15 weight % water, preferably to about 8-12 weight % water and then screened to collect particles having a preferred size distribution, e.g., between 8 and 50 mesh, preferably 10 to 40 mesh, U.S. Sieve Series. The finer and larger particles may be recycled to the pin mixer. Preferably, at least about 60 weight %, and more preferably at least about 80 weight % of the particles exiting the pin mixer are within the desired size distribution. The dried particles having the desired size distribution are tested for absorbency, attraction to a magnet, resiliency, and inhomogeneity.

The pin-mixers include an outer shell and a central, horizontal internal axis that includes a number of impeller pins extending radially outwardly that are closely spaced from an internal, cylindrical surface of the shell. An exemplary pin mixer is the model 8D32L mixer (available from Mars Mineral, Mars, Pa.), which has an 8" internal diameter, a 32" internal length, and about ½"-diameter impeller pins. In this mixer, the absorbent and metal particles enter the pin mixer at an upper end (inlet) of the cylindrical shell and are whipped by the pins at an impeller tip speed of at least about 20 ft/sec (600 rpm), preferably about 25-75 ft/sec (700-2200 rpm), and more preferably at about 35-70 ft/sec (1000-2000 rpm), as the absorbent and metal particles move toward an opposite end of the pin mixer toward a bottom outlet. Alternative geometries and/or operating conditions for the pin mixer that increase the residence time of the feed mixture may allow a reduction in the preferable impeller tip speed that yields sufficiently bound aggregates of absorbent and metal particles. As a fine spray of water is added with the absorbent and metal particles at the inlet and distributed throughout the absorbent and metal particles, high-shear mixing and micro-agglomeration of the absorbent and metal particles occurs as a result of the high-speed pins compressing and/or shearing the absorbent and metal particles together to provide homogeneous mixing of the absorbent and metal particles and to form micro-pellets. The size of the absorbent and metal particles added to the pin mixer, the percentage of water added, and the speed of rotation of the pins, can be varied to provide micro-pellets that provide a high percentage of absorbent/metal particles within the desired particle size distribution.

Pug Mill

Compression and/or shearing of the absorbent material and metal particle composition also can be conveniently carried out by using a pug mill, commonly used in the production of bricks and other ceramic materials. In general, conventional pug-mills include a tubular housing having one end open for receiving materials and the other end closed with a flat wall including one or more die openings for extruding the material therethrough. Pug-mills useful in accordance with the compositions and methods described herein may be further provided with a longitudinal axis having one or more blades disposed radially thereon. In operation, the central axis is rotated to provide shearing forces to the material within the pug-mill. The blades are inclined to a slight degree so that, as they turn, they force the absorbent material forward, toward the exit or extruding end. In this way, shear pressure forces are applied to the absorbent material and metal particles within the pug-mill. The amount or intensity of shearing forces imparted by the extrusion may be varied by changing the feed rate of absorbent material and metal particles, blade size and/or blade angle, or the size of the extruding or die opening. Also, the rotation speed of the central axis driving the mixing or auger blades and speed of the wiping blade may be varied to change shear forces. The particular operating conditions and pug mill or extruder dimensions may be varied widely.

Extruder

Application of shear pressure forces also conveniently may be applied utilizing a conventional auger extruder. Auger extruders are similar to pug mills except that the central rotating axis has a single or double screw-type mixing blade which, when rotated in the appropriate direction, mixes and conveys the absorbent material and magnetically-attractable particles toward and then through one or more die openings at the extruding end of the extruder housing. The absorbent material and magnetically-attractable particles, when extruded, exit from the die opening in pellet form, and the pellets break off from an exit end of the die opening when the pellet increases in length sufficiently to provide enough weight that the pellet breaks at the die opening exit. The pellets then are ground and sieved to the appropriate particle size distribution. As with the pug-mill, the particular dimensions, including the extruder port or die hole size and shape and/or wiper design and operating conditions may be varied widely to provide varying degrees of shear forces to the absorbent material and magnetically-attractable particles.

Counter-Current Mixer

High-shear mixing is also possible with a counter-current mixer. A counter-current mixer is a batch mixer that generates large internal shear fields with multiple rotating surfaces. Exemplary counter-current mixers include the Lancaster® K-Series mixers (available from Lancaster Products, Lebanon, Pa.). The outer wall of the circular mixing vessel rotates in one direction and an interior, high-speed mixing impeller rotates in the opposite direction, thereby increasing the local velocity gradients. The high-speed mixing impeller simultaneously meanders throughout the entire mixer volume while secondary, low-speed scrapers prevent material from settling outside of the mixing zones. The specific geometry and operating conditions of the mixer (e.g., rotation rate of the high-speed impeller, etc.) may be varied according the amounts and size distributions of non-clumping absorbent particulate material and magnetically-attractable particles added to the mixer as well as the desired homogeneity, resiliency, and size distribution of the final animal litter composition. For example, with sufficient mixing time (e.g., in the range of about 5 minutes to about 1 hour), stable aggregates of absorbent and metal particles can be formed at impeller tip speeds of at least about 2 ft/sec, and more preferably at impeller tip speeds of at least about 5 ft/sec.

The batch nature of the counter-current mixer permits multistage mixing. For instance, the absorbent material and magnetically-attractable particles may be blended in a first mixing stage. Once thoroughly blended, a binder may be added in a second mixing stage that creates bound litter particles containing both absorbent material and magnetically-attractable particles in the desired size distribution. A third, post-processing mixing stage may then be used to add surface coatings such as, for example, fragrances, color agents, anti-microbial agents, odor-control agents, odor-masking agents, bactericides, or combinations thereof.

Apparatus for the Collection of Magnetically-Attractable Animal Litter

It is desirable to have a convenient apparatus for the collection of magnetically-attractable animal litter according to the present disclosure. Magnetically-attractable animal litter outside the litter box may result from accidental spills by the pet owner or from individual litter particles being tracked out of the litter box by the pet. A magnetic mat may be used to surround the litter box and collect litter particles. An example of such a magnetic mat includes a flexible ferrite magnetic sheet (available under the name Flexmag™ from Arnold Magnetic Technologies, Marietta, Ohio) preferably having a magnetic energy of about 0.6 to 1.6 MG·Oe, more preferably of about 0.8 to 1.4 MG·Oe, and most preferably of about 1.0 to 1.2 MG·Oe. However, even if a magnetic mat is used to collect and contain litter particles, the pet owner still needs a means for removing the particles from the magnetic mat without resorting to vigorous scraping. Accordingly, FIGS. 1 and 2 present devices able to remove errant litter particles in such situations.

FIG. 1 illustrates a perspective view of a magnetic sweeper 100 in accordance with the present disclosure. The magnetic sweeper 100 has a base 140, the top surface of which has a hinge 130. One end of a stem 120 is attached to the base 140 via the hinge 130 and the other end is fitted with a handle 110 for gripping. A magnetic plate 150 is attached to the bottom of the base 140, and may be a permanent magnet. The bottom surface 152 of the magnetic plate 150 may be used to collect free-standing litter particles by brushing the magnetic sweeper 100 across the littered area and attracting the magnetically-attractable litter particles to the bottom surface 152. Additionally, the bottom surface 152 of the magnetic plate 150 may be fitted with sliding pads (not shown), rollers (not shown), or brushes (not shown) to facilitate the brushing movement.

In an alternate embodiment of the magnetic sweeper 100, the magnetic plate 150 may be an electromagnet. In this case, batteries (not shown) to operate the electromagnet may be contained, for example, in the handle 110, and a switch 112 on the stem 120 is used to selectively power on and power off the electromagnet. This embodiment has the advantage that the electromagnet may be used to collect stray magnetically-attractable litter particles that have been captured by a magnetic mat surrounding the litter box, provided that the strength of the electromagnet is stronger than that of the litter-contacting surface of the magnetic mat. Additionally, this embodiment simplifies cleaning of the magnetic sweeper 100, because the particles collected by the magnetic plate 150 may be simply removed by powering off the electromagnet.

Figure 2:
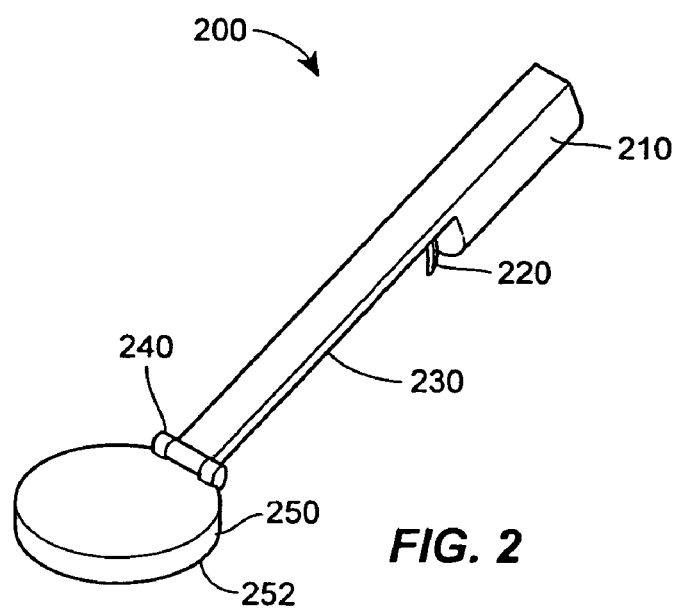
FIG. 2 illustrates a perspective view of a hand-held electromagnetic collector in accordance with the present disclosure.

FIG. 2 illustrates a perspective view of a hand-held electromagnetic collector 200 in accordance with the present disclosure. The electromagnetic collector 200 has a handle 210, the front of which is attached to stem 230. The front of the stem 230 has a hinge 240 that is attached an electromagnetic plate 250. Batteries (not shown) to operate the electromagnetic plate 250 may be contained, for example, in the handle 210, and a trigger 220 on the stem 230 is used to selectively power on and power off the electromagnetic plate 250. When powered on, the bottom surface 252 of the magnetic plate 250 may be used to collect litter particles by brushing the electromagnetic collector 200 across the littered area and attracting the magnetically-attractable litter particles to the bottom surface 252. In this way, animal litter particles may be removed from either magnetic or non-magnetic surfaces, provided that the strength of the electromagnet is stronger than that of any magnetic surfaces.

In an alternate embodiment, the batteries (not shown) of the electromagnetic collector 200 may be removed and replaced with voltage/current regulators (not shown) in the handle 210. In this case, an external power cord (not shown) is attached to the handle 210 to provide power to the electromagnetic plate 250.

Methods for Composition Characterization

[Particle Size Distribution] The size distribution of a population of particles, whether absorbent material fines individually, magnetically-attractable metal particles individually, or the aggregate composition of the present disclosure, is determined using standard sieves from the U.S. Sieve Series. A sample may also be classified using two standard sieves, with the mesh numbers of the sieve representing the upper and lower particle sizes of the classification operation. The D50 size of a population is the particle size above which 50 weight % of the population is contained.

[Water Absorbency Test] The water absorbency test measures the ability of a population of litter particles to absorb and retain liquid when wetted with water. A filter-lined funnel is loaded with about 50 g of the litter sample to be tested. About 100 ml of distilled water is poured over the litter sample at a rate of about 10 ml/min. The unabsorbed water is collected in a graduated cylinder in order to determine the weight of water absorbed by the litter sample. The absorbency is generally expressed in units of g/g (i.e., grams of water absorbed per gram of dry litter).

[Magnetic Cohesion Drop Test] The magnetic cohesion drop test measures the ability of individual litter particles to adhere to a magnetic mat upon application of dynamic forces to the mat. A magnetic mat (3"×3" mat having a magnetic energy of about 1 MG·Oe) is loaded with about 200 g of litter sample and then tipped vertically to remove any individual litter particles not in sufficient contact with the mat to adhere to the mat. The particles removed from the mat in this way are not considered in the subsequent calculations of the magnetic retention rate. The particle-laden mat is vertically dropped 1" using a trap door onto a ¾" test sieve, dislodging some of the particles from the mat. The ratio of the weight of the particles on the mat post-drop to the weight of the particles on the mat immediately pre-drop is averaged over five successive tests to determine the magnetic retention rate (generally expressed as a percent). The magnetic retention rate may be determined after consecutive drops to characterize the effect of particle size and loading on the litter sample's ability to adhere to the magnetic mat upon application of dynamic forces.

[Attrition Test—Resiliency] The resiliency attrition test measures the ability of a litter particle population to retain its particle size characteristics when subjected to the simulated trauma of post-production litter handling that can result in particle fragmentation and fines formation. An initial 50 g litter sample having particle sizes between 12 and 40 mesh (i.e., between about 425 µm and 1.68 mm) is fragmented in the pan of a rotary test sieve shaker containing ten (10) ⅝"-diameter ball bearings for 5 minutes. The rotary test sieve shaker used simultaneously swirls (at about 280 rpm) and taps (at a frequency of about 150 min$^{-1}$) the sample particles, and is available under the name Ro-Tap® 8" RX-29, Model B (available from W.S. Tyler, Mentor, Ohio). After fragmentation of the litter particles by the ball bearings, the litter sample is reanalyzed with the rotary test sieve shaker by rotating, without ball bearings, the fragmented particles for another 5 minutes in a 40-mesh sieve. After this step, the weight fraction of litter particles retained on the 40-mesh sieve post-fragmentation is reported as the resiliency of the sample (generally expressed as a percent).

[Attrition Test—Inhomogeneity] The inhomogeneity attrition test measures the ability of a litter particle population to retain its degree of attraction to a magnetic surface when subjected to the simulated trauma of post-production litter handling that can result in particle fragmentation and fines formation. The particle size distribution of a 5 g litter sample is determined and then the litter sample is evenly spread across a 2"-diameter circular area on a magnetic mat (3"×3" mat having a magnetic energy of about 1 MG·Oe). The mat is then rotated to a vertical position, thereby allowing any particles insufficiently adhered to the mat surface to fall, and the fraction of litter sample retained is calculated gravimetrically. The entire 5 g litter sample is then recovered (i.e., the particles remaining on the mat are scraped from the mat and recombined with the particles that fell from the mat) and hand-crushed on a hard surface until the D50 of the litter sample is reduced by at least about ⅓ (as verified by measurement of the particle size distribution). The crushed sample is then evenly spread across the 2"-diameter circular area of the magnetic mat, the mat is rotated to a vertical position, and the fraction of litter sample retained is calculated gravimetrically. The inhomogeneity (generally expressed as a percent) of the litter sample is calculated as the difference between the average fraction retained on the mat of the three median values from five successive tests pre-crushing and the same average post-crushing.

PRODUCT EXAMPLES

Example 1

Sample L-9

368.0 g of attapulgite (FLORIGEL® H-Y from ITC, Inc. Hunt Valley, Md.) were mixed with 32.0 g of taconite fines using a kitchen aid mixer for one minute. 180.0 g of water were added to the attapulgite-taconite mixture and mixed for another three minutes. The mixture was oven-dried at 110° C. to a moisture content of about 8% to 12%. Dried particles with sizes between 8 and 40 mesh were collected and further tested for their performance as illustrated in Tables 1, 2, and 3.

Example 2

Sample L-10

368.0 g of corn cob powder (from Mass Finishing, Inc. Howard Lake, Minn.) were mixed with 32.0 g of taconite fines using a kitchen aid mixer for one minute. 100.0 g of water were added to the corn cob-taconite mixture and mixed for another three minutes. The mixture was air-dried to a moisture content of about 1% to 5% so that the material was free-flowing. Dried particles with sizes between 8 and 40 mesh were collected and further tested for their performance as illustrated in Tables 1, 2, and 3.

Example 3

Sample L-11A 368.0 g of gypsum powder (calcium sulfate dehydrate from Spectrum Laboratory Products Inc., Gardena, Calif.) were mixed with 32.0 g of taconite fines using a kitchen aid mixer for one minute. 18.4 g of sodium silicate solution (37.11 weight % aqueous sodium silicate, product N® from PQ Corporation, Valley Forge, Pa.) and 72.0 g of water were added to the gypsum-taconite mixture and mixed for another three minutes. The mixture was oven-dried at 110° C. to a moisture content of about 10% to 15%. Dried particles with sizes between 8 and 40 mesh were collected and further tested for their performance as illustrated in Tables 1, 2, and 3.

Comparative Example

Sample L-11

368.0 g of gypsum powder (calcium sulfate dehydrate from Spectrum Laboratory Products Inc., Gardena, Calif.) were mixed with 32.0 g of taconite fines using a kitchen aid mixer for one minute. 72.0 g of water were added to the gypsum-taconite mixture and mixed for another three minutes. The mixture was oven-dried at 110° C. to a moisture content of about 10% to 15%. Dried particles with sizes between 8 and 40 mesh were collected and further tested for their performance as illustrated in Tables 1, 2, and 3.

Example 4

Sample L-12

368.0 g of attapulgite (FLORIGEL® H-Y from ITC, Inc. Hunt Valley, Md.) were mixed with 32.0 g of taconite fines using a kitchen aid mixer for one minute. 280.0 g of water were added to the attapulgite-taconite mixture and mixed for another three minutes. The mixture was extruded once using a laboratory scale extruder with a die-plate. The extrudates were oven-dried at 110° C. to a moisture content of about 8% to 12%. The dried extrudates were ground and particles with sizes between 8 and 40 mesh were collected and further tested for their performance as illustrated in Tables 1, 2, and 3.

TABLE 1

Composition and Process Summary

| Sample | Composition | Additive | Mixing Method |
|---|---|---|---|
| L-9 | Attapulgite/Taconite (92:8 weight basis) | None | Low-shear agglomeration |
| L-10 | Corn Cob/Taconite (92:8 weight basis) | None | Low-shear agglomeration |
| L-11 | Gypsum/Taconite (92:8 weight basis) | None | Low-shear agglomeration |
| L-11A | Gypsum/Taconite (92:8 weight basis) | Sodium Silicate | Low-shear agglomeration |
| L-12 | Attapulgite/Taconite (92:8 weight basis) | None | High-shear extrusion |

TABLE 2

Magnetically-attractable Litter Magnetic Effect

| | Magnetic Retention Rate | | |
|---|---|---|---|
| Sample | After 1st Drop | After 2nd Drop | After 3rd Drop |
| L-9 | 26.0% | 76.1% | 64.4% |
| L-10 | 29.9% | 57.1% | 73.6% |
| L-11 | 33.1% | 71.8% | 80.6% |
| L-11A | 37.1% | 74.7% | 84.6% |
| L-12 | 32.2% | 71.3% | 74.4% |

TABLE 3

Magnetically-attractable Litter Performance Properties

| Sample | Bulk Density (lb/ft$^3$) | Water Absorbency (g/g) | Resiliency (%) |
|---|---|---|---|
| L-9 | 37.1 | 1.97 | 48.2 |
| L-10 | 47.0 | 1.40 | 68.3 |
| L-11 | 49.4 | 0.82 | 0.1 |
| L-11A | 49.7 | 0.91 | 52.7 |
| L-12 | 36.6 | 1.86 | 65.6 |

Although the foregoing text is a detailed description of numerous different embodiments of an animal litter composition, the detailed description is to be construed as exemplary only and does not describe every possible embodiment of an animal litter composition in accordance with the disclosure.

What is claimed is:

1. A particulate non-clumping animal litter composition, comprising animal litter particles of non-clumping absorbent particulate material and magnetically attractable metal particles bound together, said animal litter particles comprising:
    (a) about 50 to 98 weight % of a non-clumping absorbent particulate material; and,
    (b) about 2 to 50 weight % of magnetically-attractable metal particles;

wherein:
    (i) the non-clumping absorbent particulate material and magnetically-attractable metal particles are bound together; and,
    (ii) substantially all particles of the animal litter composition are attracted to a magnetic surface.

2. The animal litter composition of claim 1, wherein the resiliency of the animal litter composition is at least about 40%, the resiliency being determined by measuring the weight fraction of animal litter particles initially larger than 40 mesh that are retained on a 40-mesh sieve after being fragmented by swirling at a rate of about 280 rpm and tapping at a frequency of about 150 min$^{-1}$ for 5 minutes in the pan of a rotary test sieve shaker containing ten ⅝"-diameter ball bearings.

3. The animal litter composition of claim 2, wherein the resiliency of the animal litter composition is at least about 45%.

4. The animal litter composition of claim 3, wherein the resiliency of the animal litter composition is about 50 to 98%.

5. The animal litter composition of claim 1, comprising about 80 to 97 weight % of the non-clumping absorbent particulate material and 3 to 20 weight % of magnetically-attractable metal particles.

6. The animal litter composition of claim 1, wherein the non-clumping absorbent particulate material comprises calcium bentonite, talc, pyrophyllite, vermicullite, illite, phlogopite, muscovite clay, kaolinite clay, attapulgite, sepiolite clay, alganite, diatomite, tobermorite, marl, calcined clay, zeolite, silica, silica gel, sand, fullers earth, diatomaceous earth, cellulosic material, corn cob, straw, rice husk, maize fiber alfalfa, wheat, nut shells, grass, green tea leaves, absorbent polymers, calcium silicate, gypsum, synthetic gypsum, slate, pumice, building waste, or mixtures thereof.

7. The animal litter composition of claim 1, wherein the non-clumping absorbent particulate material comprises a non-swelling clay.

8. The animal litter composition of claim 1, wherein the non-swelling clay is selected from the group consisting essentially of: calcium bentonite, kaolinite, attapulgite, and sepiolite.

9. The animal litter composition of claim 1, wherein non-clumping absorbent particulate material has a particle size distribution such that at least 25 weight % of the particles pass a 50-mesh sieve.

10. The animal litter composition of claim 1, wherein the magnetically-attractable metal particles comprise iron, nickel, cobalt, or mixtures thereof.

11. The animal litter composition of claim 1, wherein the magnetically-attractable metal particles have a particle size distribution such that at least 25 weight % of the particles pass a 50-mesh sieve.

12. The animal litter composition of claim 1, wherein the magnetically-attractable metal particles comprise magnetite, taconite, or mixtures thereof.

13. The animal litter composition of claim 1, wherein the magnetically-attractable metal particles comprise taconite having an iron content of at least 25 weight %.

14. The animal litter composition of claim 1, wherein the particles of the animal litter composition have particle sizes between 8 and 50 mesh.

15. The animal litter composition of claim 14, wherein the particles of the animal litter composition have particle sizes between 10 and 40 mesh.

16. The animal litter composition of claim 1, further comprising an additive selected from the group consisting essentially of: carboxymethyl cellulose, methyl cellulose, hydroxypropyl cellulose, hydroxypropylmethyl cellulose, hydroxybutylmethyl cellulose, sodium silicate, starch, dextrin, xanthan gum, guar gum, lignin, sodium or calcium lignosulfonate and their derivatives, sucrose, lactose, and dextrose.

17. The animal litter composition of claim 1, further comprising an additive selected from the group consisting essentially of: carboxymethyl cellulose, sodium silicate, xanthan gum, and guar gum.

18. The animal litter composition of claim 1, further comprising an additive selected from the group consisting essentially of: a fragrance, a color agent, an anti-microbial agent, an odor-control agent, an odor-masking agent, and a bactericide.

19. The animal litter composition of claim 1, further comprising a surface coating selected from the group consisting essentially of: a fragrance, a color agent, an anti-microbial agent, an odor-control agent, an odor-masking agent, and a bactericide.

20. A particulate non-clumping animal litter composition, comprising:
    (a) about 50 to 98 weight % of a non-clumping absorbent particulate material; and,
    (b) about 2 to 50 weight % of magnetically-attractable metal particles;
    wherein:
        (i) the non-clumping absorbent particulate material and magnetically-attractable metal particles are bound together; and,
        (ii) the inhomogeneity of the animal litter composition is not more than about 30%, wherein the inhomogeneity is determined by measuring the reduction in weight fraction of animal litter particles adhering to a vertical magnetic surface after being crushed such that the D50 of the animal litter particles after crushing is at least about ⅓ less than the D50 of the animal litter particles before crushing.

21. The animal litter composition of claim 20, wherein the inhomogeneity of the animal litter composition is not more than about 20%.

22. The animal litter composition of claim 21, wherein the inhomogeneity of the animal litter composition is not more than about 10%.

23. A method of manufacturing a magnetically-attractable particulate non-clumping animal litter, comprising:
    mixing about 50 to about 98 weight % of a non-clumping absorbent particulate material together with about 2 to about 50 weight % of magnetically-attractable metal particles;
    wherein the mixing is accomplished with mixer that imparts sufficient shear to the absorbent and metal particles such that:
        (i) the non-clumping absorbent particulate material and magnetically-attractable metal particles are bound together in stable, non-dusty aggregates; and,
        (ii) substantially all particles of the animal litter composition are attracted to a magnetic surface.

24. The method of claim 23, wherein the resiliency of the animal litter composition is at least about 50%, the resiliency being determined by measuring the weight fraction of animal litter particles initially larger than 40 mesh that are retained on a 40-mesh sieve after being fragmented by swirling at a rate of about 280 rpm and tapping at a frequency of about 150 min$^{-1}$ for 5 minutes in the pan of a rotary test sieve shaker containing ten ⅝"diameter ball bearings.

25. The method of claim 23, wherein the mixer is selected from the group consisting essentially of: a pin mixer, a pug mill, an extruder, or a counter-current mixer.

26. The method of claim 23, wherein the mixer comprises a rotating impeller having a tip, wherein the impeller tip speed is about 2 to 85 ft/sec.

27. The method of claim 26, wherein the mixer comprises a rotating impeller having a tip, wherein the impeller tip speed is about 5 to 75 ft/sec.

28. The method of claim 27, wherein the mixer comprises a rotating impeller having a tip, wherein the impeller tip speed is about 20 to 70 ft/sec.

29. The method of claim 28, wherein the mixer comprises a rotating impeller having a tip, wherein the impeller tip speed is about 35 to 65 ft/sec.

30. A method of manufacturing a magnetically-attractable particulate non-clumping animal litter having a particular final particle size distribution, comprising mixing a non-clumping absorbent particulate material together with magnetically-attractable metal particles, wherein:
    (i) the non-clumping absorbent particulate material has a D50 less than the D50 of the final particle size distribution of the magnetically-attractable particulate clumping animal litter; and,
    (ii) the mixing is accomplished with sufficient shear to adhere the non-clumping absorbent particulate material and the magnetically-attractable metal particles and to provide water-absorbent magnetically-attractable particulate clumping animal litter particles having the particular final particle size distribution without grinding or otherwise subdividing the adhered absorbent and metal particles.

31. The method of claim 30, wherein the D50 of the non-clumping absorbent particulate material is less than about 300 μm.

32. The method of claim 30, wherein the D50 of the non-clumping absorbent particulate material is less than about 200 μm.

33. The method of claim 30, wherein at least about 60 weight % of the magnetically-attractable particulate clumping animal litter particles generated by the mixing step have sizes between 8 and 50 mesh.

34. The method of claim 33, wherein about 70 to 99 weight % of the magnetically-attractable particulate clumping animal litter particles generated by the mixing step have sizes between 8 and 50 mesh.

35. The method of claim 34, wherein about 80 to 95 weight % of the magnetically-attractable particulate clumping animal litter particles generated by the mixing step have sizes between 8 and 50 mesh.

36. The method of claim 30, wherein about 75 to 95 weight % of the magnetically-attractable particulate clumping animal litter particles generated by the mixing step have sizes between 10 and 40 mesh.

37. A particulate clumping animal litter composition, comprising animal litter particles of non-clumping absorbent particulate material and magnetically attractable metal particles bound together, said animal litter particles comprising:
    (a) about 85 to 95 weight % of non-swelling clay particles having a particle size distribution such that at least 50 weight % of the particles pass a 50-mesh sieve; and,
    (b) about 5 to 15 weight % of magnetically-attractable metal particles having a particle size distribution such that at least 50 weight % of the particles pass a 50-mesh sieve, the magnetically-attractable metal particles comprising magnetite, taconite, or mixtures thereof;

wherein:
(i) the attapulgite particles and magnetically-attractable metal particles are bound together;
(ii) the particles of the animal litter composition have particle sizes between 8 and 50 mesh;
(iii) substantially all particles of the animal litter composition are attracted to a magnetic surface; and,
(iv) the resiliency of the animal litter composition is at least about 50%, the resiliency being determined by measuring the weight fraction of animal litter particles initially larger than 40 mesh that are retained on a 40-mesh sieve after being fragmented in the pan of a rotary test sieve shaker containing ten ⅝"-diameter ball bearings for 5 minutes.

38. The animal litter composition claim 37, wherein the inhomogeneity of the animal litter composition is not more than about 20%, wherein the inhomogeneity is determined by measuring the reduction in weight fraction of animal litter particles adhering to a vertical magnetic surface after being crushed such that the D50 of the animal litter particles after crushing is at least about ⅓ less than the D50 of the animal litter particles before crushing.

39. The animal litter composition of claim 37, wherein the non-swelling clay is selected from the group consisting essentially of: calcium bentonite, kaolinite, attapulgite, and sepiolite.

* * * * *